United States Patent [19]

Sterka

[11] Patent Number: 5,303,896
[45] Date of Patent: Apr. 19, 1994

[54] MODEL AIRPLANE ENGINE MOUNTING SYSTEM

[76] Inventor: William E. Sterka, 3446 Anglin Dr., Sarasota, Fla. 34242

[21] Appl. No.: 974,537

[22] Filed: Nov. 12, 1992

[51] Int. Cl.⁵ .............................................. B64D 27/00
[52] U.S. Cl. ..................................... 248/557; 244/54; 248/634; 248/635; 248/638
[58] Field of Search ............... 248/557, 581, 634, 635, 248/638; 244/1 N, 54

[56] References Cited

U.S. PATENT DOCUMENTS

| | | | |
|---|---|---|---|
| 3,455,525 | 7/1969 | Waermö | 248/635 X |
| 4,108,401 | 8/1978 | Sullivan | 244/54 |
| 4,249,711 | 2/1981 | Godbersen | 244/54 |
| 4,286,777 | 9/1981 | Brown | 248/635 X |
| 4,809,960 | 3/1989 | Kakimoto et al. | 248/635 X |
| 5,046,979 | 9/1991 | Ragan et al. | 244/54 X |
| 5,141,203 | 8/1992 | Baker et al. | 248/635 |
| 5,145,330 | 9/1992 | Uchiyama | 248/635 X |
| 5,154,403 | 10/1992 | Sato | 248/635 X |

OTHER PUBLICATIONS

G & A Products Brochure-Model Aviation Magazine Dec., 1989.
Gator R/C Products-Model Aviation Magazine Mar., 1992.
Sullivan Products-Radio Control Modeler-Dec. 1992.
Davis Diesel Development-Radio Control Modeler Magazine-Apr. 1991.
Software Associates-Model Aviation-Dec. 1990.

Primary Examiner—David A. Scherbel
Assistant Examiner—Derek J. Berger
Attorney, Agent, or Firm—Charles J. Prescott

[57] ABSTRACT

A model airplane engine mounting system for isolating vibration between a model airplane and a combustion-type model engine which mounting system is connectable to an upright fire wall panel of the airplane. The device includes uniquely configured two-part grommets which act between a split spool and a cylindrical mounting boss of the engine mounts to isolate both fore-and-aft thrust and shear or rotational torque, harmonics, and combustion outputs from the engine. The grommets, in combination with two-part t-section spool halves, provide a captive engine mount system which is easily connectable to the fire wall by conventional bolts.

12 Claims, 1 Drawing Sheet

MODEL AIRPLANE ENGINE MOUNTING SYSTEM

BACKGROUND OF THE INVENTION

This invention relates generally to engine mounting systems which isolate vibration between a combustion-type engine and a support frame, and more particularly to a model airplane engine isolation and mounting system.

As the model aviation field has grown, both the aircraft design and the model airplane engines themselves have become more sophisticated and refined. This refinement has led to larger model aircraft and associated combustion-type model engines, as well as significantly more sophisticated radio, transmitter and receiver equipment.

Typically, the model aircraft itself is fabricated of either balsa wood and hardwood or a molded fiberglass air frame. In either event, delicate receiver and servo equipment are mounted within the air frame itself. Although elastomeric grommets are utilized in mounting the servos, and the receiver is wrapped in protective foam before installation, nonetheless larger combustion-type engines, both 2- and 4-stroke versions, generate significant vibration throughout the air frame when bolted directly to an upright fire wall thereof. Transmittal of these combustion and rotational vibrations are transmitted directly into the air frame because, in most instances, the only thing separating the engine and air frame fire wall is a one or two-part rigid engine mount.

An additional detrimental effect of transmitting engine vibration into the air frame is that glue joints and other bolt-on type equipment can be induced to fatigue, failure or disengagement. Hinges and actuating linkages for movable surfaces are also at risk from engine vibration and combustion harmonics. Additionally, and very importantly, noise, the loud drumming sound created by vibration transmitted throughout the model aircraft, has become a significant problem as noise limitations are currently being adapted and enforced at almost all model aircraft flying sites.

A number of devices have been introduced into the marketplace which, by their claims, afford some level of engine vibration isolation. However, many of these presently available model engine mounting systems have at least one of several failings. First, not all modes of vibration output from the model engine are adequately absorbed and isolated. Fore and aft forces are generated in the form of engine thrust through the propeller. Additionally, rotational torque and combustion harmonics inputs are also induced into the air frame, as well as lateral shear movement in all directions orthogonal to the axis of the engine.

A second failing of many of the present mounting systems available is that the engine/engine mounts are not captively connected to the air frame which could result in the rather violent disconnection between model engine and airplane when under power.

Yet another failing of some of the presently available systems is the difficulty with their installation. Some mounting systems require very accurate cutting and/or machining of the components to suit each environment. Almost all require that access be had to the rearward or inward side of the fire wall on an ongoing basis to effect installation, tightening and removal of the associated mounting hardware.

One such presently available system is manufactured by Gator R/C Products, Inc. of Pensacola, Fla. which provides two forms of its SOFT-N-SAFE model engine mounting system. One form is a radial mounting system providing a radial mounting plate which boltably connects to the existing back plate area of the model engine. The other form of this device provides a separate engine mount which boltably connects between engine and fire wall. Both embodiments provide a unique ISO-DAMP one-piece ribbed grommet having special serrations disposed against the fire wall surface and opposing spaced washer. The SOFT-N-SAFE mounting system does provide a captive arrangement, and does appear to afford fore and aft vibration isolation, but does very little to absorb both rotational harmonic and lateral shear engine vibration and movement.

Another device of which applicant is aware is the SOFT MOUNT model engine mounting systems provided by Software Associates of Houston, Tex. This mounting system, which is connectable between a conventional rigid engine mount and the fire wall of the air frame, provides a unique combination of mating elongated channel sections, one of which is U-section and houses a pair of conventional Lord-type cylindrical elastomer mounts, the other mating channel being L-shaped in cross section and connected between the exposed end of the elastomer mounts and the fire wall. The SOFT MOUNT places the elements in compression and shear and appears to provide a limited captive feature by virtue of a rigid inner sleeve bonded centrally within each of the Lord-type elastomeric mounts. Assembly and disassembly is cumbersome at best.

Sullivan Products of Baltimore, Md. also provides a model engine mount system which includes a special mounting plate interconnectable between engine back plate and conventional Lord-type mounts to blind nuts mounted on the back or inner surface of the fire wall.

An ISO-MOUNT system by Davis Diesel Development of Milford, Conn. is also presently being marketed which incorporates a conventional array of disc-shaped rubber isolators interconnectable between a specially configured engine mount and the air frame fire wall. This system also incorporates a conventional collapsible tubular T-nut which deforms to connect into a mating hole in the fire wall to facilitate later removal and reinstallation of the system.

Applicant is also aware of the VEND MOUNT which provides inner and outer shouldered rubber grommets which are inserted through a suitable hole formed in the fire wall from either side thereof. A conventional fastener then clampably connects engine mount to fire wall via this split grommet arrangement.

The present invention provides a uniquely configured split grommet arrangement in combination with a split spool arrangement and a cooperatively structured rigid engine mount which may be either one or two part, the invention is easily boltable to a fire wall utilizing conventional blind nuts permanently positioned on the inner or rearward surface of the fire wall. All modes of vibration are effectively absorbed by this invention while providing a fully captive structure to prevent loss of engine control.

BRIEF SUMMARY OF THE INVENTION

This invention is directed to a model airplane engine mounting system for isolating vibration between a model airplane and a combustion-type model engine which mounting system is connectable to an upright fire wall panel of the airplane. The device includes uniquely configured two-part grommets which act between a split spool and a cylindrical mounting boss of the engine mounts to isolate both fore-and-aft thrust and shear or rotational torque and combustion outputs and harmonics from the engine. The grommets, in combination with two-part t-section spool halves, provide a captive engine mount system which is easily connectable to the fire wall by conventional bolts.

It is therefore an object of this invention to provide a vibration isolation mounting system between a model airplane fire wall and its associated combustion-type model engine which effectively isolates all forms of vibration generated by the engine.

It is yet another object of this invention to provide a vibration isolation mounting system between a model airplane fire wall and its associated combustion-type model engine which is fully captive to prevent loss of engine control.

It is yet another object of this invention to provide a vibration isolation mounting system between a model airplane fire wall and its associated combustion-type model engine which is easily installable and removable without the need for special measurements, equipment or access to the rear or interior of the fire wall.

It is yet another object of this invention to provide a universal engine mounting and vibration isolation system which reduces noise produced by the model airplane induced by the engine.

It is yet another object of this invention to provide a universal engine mounting and vibration isolation system for model airplanes and a wide size range of designs.

In accordance with these and other objects which will become apparent hereinafter, the instant invention will now be described with reference to the accompanying drawings.

DETAILED DESCRIPTION OF THE INVENTION

Figures 1, 2, 3:
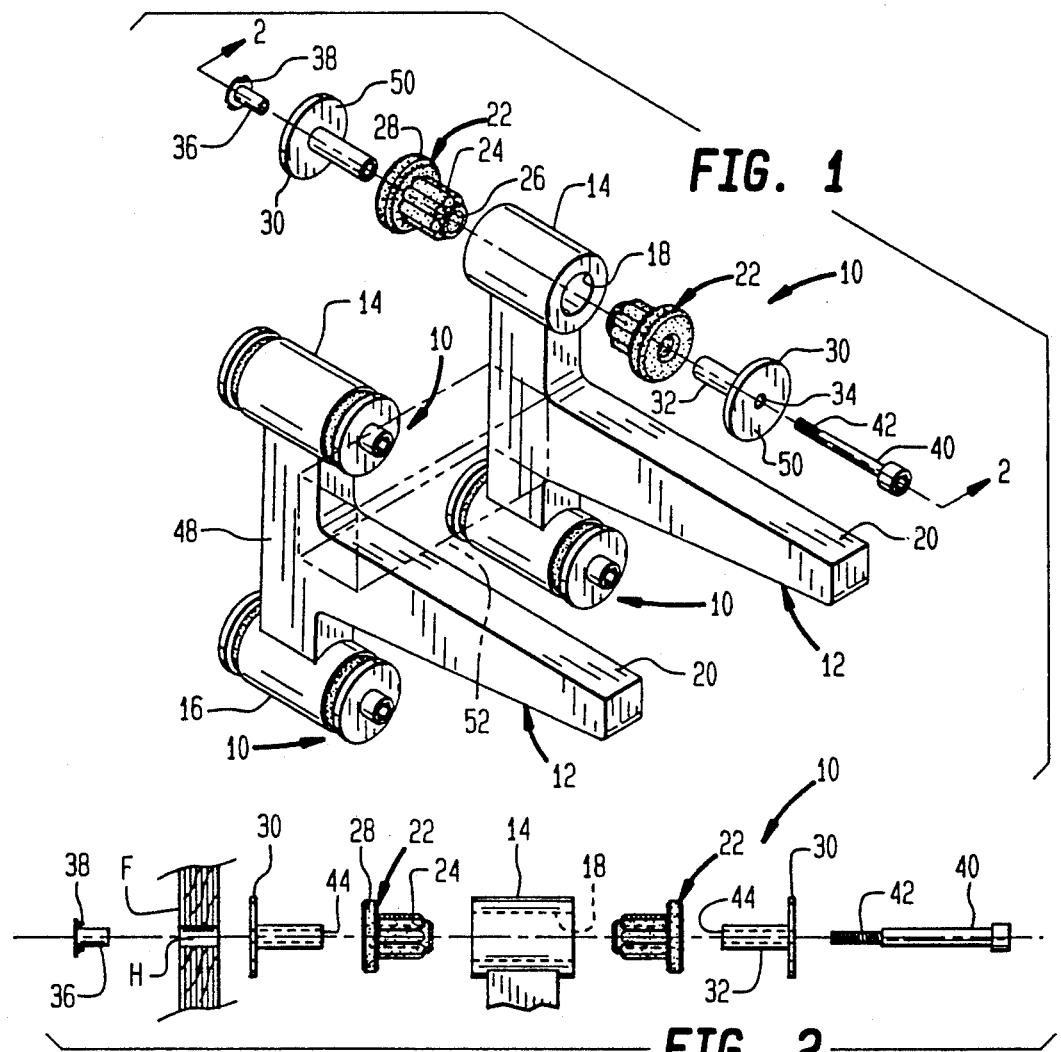
FIG. 1 is a perspective exploded view of the invention.
FIG. 2 is an exploded view in the direction of arrows 2—2 in FIG. 1.
FIG. 3 is a side elevation partial section view of FIG. 1.

Referring now to the drawings, the invention is shown generally at numeral 10 and includes a plurality of pairs of elastomeric grommet halves shown generally at 22, a pair of rigid beam-type engine mounts 12, a plurality of pairs of rigid spool halves 30 and mounting bolts 40 which threadably engage at 42 into blind nuts 36 in a conventional fashion.

Each beam-type engine mount 12, typically fabricated of machined or formed aluminum, molded fiber reinforced nylon or resin or the like, includes an engine mounting surface 20 which extends generally orthogonally from an upright main body portion 48. Each main body portion 48 for bearing the model engine (not shown) includes an integral mounting boss 14 and 16 disposed at each end thereof. Each of the mounting bosses 14 and 16 include a longitudinal hole 18 formed therethrough which has an axis generally parallel to each mounting surface 20.

Each of the elastomer grommet halves 22 includes a fluted main body portion 24 and an enlarged shoulder portion 28 at one end thereof. The outer diameter of the fluted portions 24 are sized to snugly slidably fit within mounting holes 18 so that each shoulder 28 will matably engage against the end surfaces of mounting boss 14 and so that the distal ends of each fluted main body portion 24 abut end-to-end as best seen in FIG. 3. Although a fluted main body portion 24 is preferred, the composition and hardness of the elastomeric compound used in molding the grommets may be varied to achieve a similar result.

Each grommet half 22 includes a longitudinal hole 26 formed therethrough. This hole is sized to snugly slidably mate over a cylindrical main tubular portion 32 of each spool half 30. Each of the spool halves 30 include an enlarged flange 50 at one end which is generally of a diameter similar to that of the shoulder 28 of grommet half 22. Further, each of the main tubular portions 32 are sized in length so as to abut one another end-to-end at 46 as shown in FIG. 3 on assembly so that the shoulder portions 28 are slightly compressed between flanges 50 and the corresponding ends of each boss portion 14 and 16. An elongated bolt 40 which matably engages into blind nut 36 secures this arrangement. Blind nut 36 having teeth 38 will be permanently secured into the rear or enclosed side of fire wall F in the conventional manner.

By this arrangement, the fluted main body portions 24 resiliently act between mounting holes 18 and the main tubular portions 32 of mating spool halves 30. These fluted main body portions 24 thus provide the resilient isolation of all shear-type movement, including rotational harmonic and lateral and vertical movement of the engine mounts 12 induced by the model engine (not shown).

To isolate fore and aft vibration and movement between the engine mounts 12 and the fire wall F, the enlarged shoulder portions 28 of each of the grommet halves 22 have been provided as previously described. The degree of compression of these shoulder portions 28 may be varied, depending on their thickness and/or the overall length of the cylindrical main tubular portions 22 of each spool half 30.

Importantly, by this arrangement, a fully captive isolation mounting arrangement is provided. That is to say, no failure of the isolation mounting system, except for a fracture of the mounting bolt 40 or a failure between the threading engagement of the mounting bolt at 42 with the blind nut 36, can result in a detachment of the engine mounts 12 from the fire wall F. Flanges 50 acting against elastomer shoulder portions 28 at either end of the mounting bosses 14 and 16 fully entrap and confine each engine mount 12.

In the preferred embodiment, the thickness of each shoulder portion 28 is generally equal to the nominal wall thickness of the fluted main body portion 24 of each grommet half 22 as best seen in FIG. 3. Additionally, to maximize the shear or rotational isolation characteristics of this mounting system 10, the fluted portion 24 is of a length generally equal to approximately three times the thickness of the shoulder portion 28, the overall lengths of mounting bosses 14 and the main tubular portions 32 corresponding thereto.

The preferred embodiment provides two separate engine mounts 12 so that the spacing therebetween may be universal and chosen to accommodate a broad variety of engine sizes. However, it should be understood that an alternate embodiment of the invention foresees that the engine mounts 12 may be made integral between upright portions 48 as shown in phantom at 52 in FIG. 1 to provide further strength and rigid alignment between the forks and mounting surfaces 20 of the engine mounting system.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A model airplane engine mounting system for isolating vibration between a model airplane and a combustion-type model engine, said mounting system connectable to an upright fire wall panel of the airplane, comprising:

two rigid engine mounts each including an elongated main mount portion and elongated mounting fork having a flat mounting surface integral with an extending generally orthogonally from said elongated main mount portion;

each said main mount portion having two spaced rigidly connected elongated mounting bosses each having a mounting hole formed longitudinally therethrough generally parallel to said mounting surface;

an elastomer grommet formed of two halves each having a longitudinally fluted main body portion and an enlarged shoulder portion disposed at one end of said grommet half, and radially extending therefrom, said main body portion and said shoulder portion having an elongated longitudinal grommet hole formed centrally therethrough;

each said mounting hole sized to snugly receive said two grommet main body portions fitted into one said mounting hole from either end thereof, said two grommet main body portions having a combined length generally equal to the length of each said mounting boss such that each said should portion fits against one end of one said mounting boss when said grommet main body portions are abutted end to end within said mounting boss;

a rigid spool formed of two spool halves each having a cylindrical main tubular portion and an enlarged flange radially extending from one end of each said main tubular portion;

each said grommet hole sized to snugly receive one said spool half fitted into one said grommet hole, said two spool halves having a combined length slightly shorter than the combined length of said grommets such that each said flange compresses one said grommet shoulder portion when said tubular portions are abutted together end to end within said grommet;

an elongated mounting bolt sized to fit through each said spool and to threadably engage into a blind nut connected to the fire wall.

2. A model airplane engine mounting system as set forth in claim 1, wherein:

said grommet main body includes a side wall having a thickness generally similar to said shoulder portion.

3. A model airplane engine mounting system as set forth in claim 1, wherein: said shoulder portion and said flange are circular and similar in diameter.

4. A model airplane engine mounting system as set forth in claim 3, wherein: said grommet main body portion has a length in the range of about three times a thickness of said shoulder portion.

5. A model airplane engine mounting system for isolating vibration between a model airplane and a combustion-type model engine, said mounting system connectable to an upright fire wall panel of the airplane comprising:

a rigid engine mount including two integrally connected elongated main mount portions and two elongated mounting forks each having a flat mounting surface integral with and extending generally orthogonally from said elongated main mount portion;

said main mount portion having a plurality of spaced rigidly connected elongated mounting bosses each having a mounting hole formed longitudinally therethrough generally parallel to each said mounting surface;

an elastomer grommet formed of two grommet halves each having a longitudinally fluted main body portion and an enlarged shoulder portion disposed at one end of said grommet half and radially extending therefrom, said main body portion and said shoulder portion having an elongated longitudinal grommet hole formed centrally therethrough;

each said mounting hole sized to snugly receive said two grommet main body portions fitted into one side mounting hole from either end thereof, said two grommet main body portions having a combined length generally equal to the length of each said mounting boss such that each said should portion fits against one end of one said mounting boss when said grommet main body portions are abutted end to end within said mounting boss;

a rigid spool formed of two spool halves each having a cylindrical main tubular portion and an enlarged flange radially extending from one end of each said main tubular portion;

each said grommet hole sized to snugly receive one said spool half fitted into one said grommet hole, said two spool halves having a combined length slightly shorter than the combined length of said grommet such that each said flange compresses one said grommet shoulder portion when said tubular portions are abutted together end to end within said grommet;

an elongated mounting bolt sized to fit through each said spool and to threadably engage into a blind nut connected to the fire wall.

6. A model airplane engine mounting system as set forth in claim 5, wherein:

of said grommet main body includes a side wall having a thickness generally similar to said shoulder portion.

7. A model airplane engine mounting system as set forth in claim 5, wherein: said shoulder portion and said flange are circular and similar in diameter.

8. A model airplane engine mounting system as set forth in claim 5, wherein: said grommet main body portion has a length in the range of about three times a thickness of said shoulder portion.

9. A model airplane engine mounting system for isolating vibration between a model airplane and a combustion-type model engine, said mounting system connectable to an upright fire wall panel of the airplane, comprising:

two rigid engine mounts each including an elongated main mount portion and elongated mounting fork having a flat mounting surface integral with and extending generally orthogonally from said elongated main mount portion;

each said main mount portion having two spaced rigidly connected elongated mounting bosses each having a mounting hole formed longitudinally therethrough generally parallel to said mounting surface;

an elastomer grommet formed of two grommet halves each having an elongated cylindrical main body portion and an enlarged shoulder portion disposed at one end of said grommet half, and radially extending therefrom, said main body portion and said shoulder portion having an elongated longitudinal grommet hole formed centrally therethrough;

each said mounting hole sized to snugly receive said two grommet main body portions fitted into one said mounting hole from either end thereof, said two grommet main body portions having a combined length generally equal to the length of each said mounting boss such that each said should portion fits against one end of one said mounting boss when said grommet main body portions are abutted end to end within said mounting boss;

a rigid spool formed of two spool halves each having a cylindrical main tubular portion and an enlarged flange radially extending from one end of each said main tubular portion;

each said grommet hole sized to snugly receive one said spool half fitted into one said grommet hole, said two spool halves having a combined length slightly shorter than the combined length of said grommets such that each said flange compresses one said grommet shoulder portion when said tubular portions are abutted together end to end within said grommet;

an elongated mounting bolt sized to fit through each said spool and to threadably engage into a blind nut connected to the fire wall.

10. A model airplane engine mounting system as set forth in claim 9, wherein:
of said grommet main body includes a side wall having a thickness generally similar to said shoulder portion.

11. A model airplane engine mounting system as set forth in claim 9, wherein: said shoulder portion and said flange are circular and similar in diameter.

12. A model airplane engine mounting system as set forth in claim 11, wherein: said grommet main body portion has a length in the range of about three times a thickness of said shoulder portion.

* * * * *